United States Patent [19]

Benderly

[11] 3,904,435

[45] Sept. 9, 1975

[54] MULTI-MODE THERMAL BATTERY

[75] Inventor: Asaf A. Benderly, Potomac, Md.

[73] Assignee: The United States of America as represented by the Secretary of the Army, Washington, D.C.

[22] Filed: Aug. 2, 1973

[21] Appl. No.: 385,211

[52] U.S. Cl. .............................. 136/90; 136/83 T
[51] Int. Cl.$^2$ ........................................ H01M 6/30
[58] Field of Search ............................ 136/90, 83 T

[56] References Cited
UNITED STATES PATENTS
3,725,132  4/1973  Moser et al. ........................ 136/90

Primary Examiner—Verlin R. Pendegrass
Attorney, Agent, or Firm—Nathan Edelberg; Robert P. Gibson; Saul Elbaum

[57] ABSTRACT

A thermal cell comprising: (1) electrodes, (2) at least one solid salt disposed between the electrodes and capable of providing a low, but useful, ionic conductivity at ambient temperatures and becoming a strong ionic electrolyte upon thermal activation, and (3) means contained in the cell for supplying a sufficient amount of heat to thermally activate the solid salt thereby causing the salt to become a strong ionic conductor. These thermal cells are useful in electric ordnance applications wherein low, but useful, power requirements exist for a long period of time following by considerably high power requirements for a short period of time.

5 Claims, No Drawings

MULTI-MODE THERMAL BATTERY

RIGHTS OF THE GOVERNMENT

The invention described herein may be manufactured, used and licensed by or for the United States Government for governmental purposes without the payment to me of any royalty thereon.

BACKGROUND OF THE INVENTION

This invention relates to batteries, particularly thermal batteries utilizing electrolytes providing small, but useful amounts of electrical energy over long periods of time and upon thermal activation, provide high electrical energy for a shorter period of time.

Batteries designed for thermal activation have conventionally utilized solid electrolytes having negligible conductivity under conditions of normal ambient temperature. Activation is accomplished by heating the electrolyte above its melting point. When liquefied, it becomes a good ionic conductor and the battery becomes electrochemically active. Such batteries remain active only while the electrolyte exists in a hot, melted or liquid state. In order to insure the successful functioning of thermal batteries, it is important that these batteries have a long shelf life, i.e., remain electrically non-conductive until such time that there is instantaneous battery activation.

One of the serious drawbacks of thermal batteries up until this time is their inability to be used in electric ordnance applications wherein relatively low, but useful, power requirements exist for a long period of time followed by a substantially instantaneous demand for considerably high power requirements for a relatively short period of time. For example, a high-resolution electronic time fuze might require a few microamps, virtually available in the gun barrel, for the timing function, and at the end of the flight require a firing pulse in the high milliamp region for a short period of time.

A great need, therefore, exists for the development of a thermal battery capable of operating over the desired temperature ranges and yield two levels of power, a low level of power over a long period of time and a high level of power for a short period of time.

OBJECTS OF THE INVENTION

Accordingly, a significant object of the present invention is the provision of a multi-mode battery capable of providing low, but useful, electrical current for a long period of time followed by a demand for considerable power for a short period of time.

Another significant object of this invention is the provision of a battery with a solid electrolyte and a heat source to provide a significant temperature rise that can be induced on demand.

A still further object of this invention is the provision of a battery utilizing a solid electrolyte material capable of operating a timing or sensing circuit having low power requirements and incapable of furnishing sufficient electrical energy to initiate a detonator until thermally activated. Consistent with this object of the invention is the provision of a battery offering an added degree of safety with respect to premature detonations.

The invention will be better understood and objects other than those set forth above will become apparent after reading the following description of preferred, yet illustrative, embodiments hereof.

BRIEF DESCRIPTION OF THE INVENTION

It has now been discovered that these and other objects may be accomplished by employing a thermal cell comprising: (1) electrodes; (2) at least one salt disposed between the electrodes, the salt being solid and capable of providing a low, but useful, ionic conductivity, at ambient temperatures and becoming a strong ionic electrolyte upon thermal activation; and (3) means contained in the cell for supplying a sufficient amount of heat to either melt or cause a solid state phase change in the salt and thereby causing the salt to become a strong ionic conductor.

The use of thermal batteries capable of providing low energy requirements over long periods of time and considerably higher energy requirements upon demand, e.g., upon thermal activation, now makes it possible to employ these batteries in electric ordnance devices with a higher degree of safety than has been possible heretofore.

DETAILED DESCRIPTION OF THE INVENTION

More specifically, the thermal cells of the present invention utilize a particular type of salt in order to achieve the desired two-level, energy requirements of the cell. These salts exist initially in a solid state capable of conducting a small and useful current thereby enabling the cell to provide energy for a particular or desired function. Upon thermal activation, the cell is capable of satisfying considerably greater energy requirements. These greater energy requirements are satisfied, for example, by a significant temperature rise taking place within the cell and converting the solid inorganic salt into a molten or liquid state. Instead of undergoing a change of phase from solid to liquid, another embodiment of this invention relates to the increased conductivity of the electrolyte by a significant temperature increase due to a change whereby transition from one crystalline state to another crystalline state the final solid phase is substantially conductive.

Particularly suitable salts useful as electrolytes for the thermal cells of the present invention and capable of undergoing substantial changes in conductivity are selected from the group consisting of silver iodide, silverrubidium iodide, lithium iodide, lithium tungstate, alkyl ammonium iodides, and mixtures thereof.

The alkylammonium iodides contain one or more alkyl groups, and preferably 4 alkyl groups attached to the nitrogen atom, e.g., a quaternary ammonium compound wherein the alkyl groups are preferably, though not necessarily, identical. When a quarternary ammonium compound is employed, each of the alkyl groups contain predetermined amounts of carbon atoms although best results are achieved when each alkyl group contains from 1 to 4 carbon atoms; preferably tetramethyl or tetramethyl ammonium iodide. It is understood that other anions functionally equivalent with iodide may be attached to the nitrogen atom.

The thermal cells of the instant invention are applicable to those ordnance applications having relatively low power requirements over a relatively long period of time followed by a demand for considerable power for a rather short period of time. In a related mode of operation, a solid electrolyte battery, capable of being stored for a long period of time on an open circuit, would, on demand, receive a thermal input from a built in thermal source. This rise in temperature would allow for a higher drain capability for a few minutes during which time a large capacitor would be charged. Upon cooling, the battery would revert to an ordinary solid electrolyte power supply once more capable of supplying lower power to: (a) maintain the charge on the capacitor for a considerable period of time, e.g., 30 days and/or (b) operate timing or sensing circuits of low power requirements. This type of power supply would be useful in scatterable mines where long term, inactive storage is coupled with the need for days or weeks of active life followed by a firing pulse.

I wish it to be understood that I do not desire to be limited to the exact details of construction shown and described, for obvious modifications can be made by a person skilled in the art.

Accordingly, what is claimed is:

1. A thermal cell comprising: (1) electrodes; (2) at least one salt disposed between said electrodes, said salt being solid and capable of providing a low, but useful, ionic conductivity at ambient temperatures and becoming a strong ionic electrolyte upon thermal activation, said salt being selected from the group consisting of silver-rubidium iodide, lithium iodide, lithium tungstate, alkyl ammonium iodide, and mixtures thereof; and (3) means contained in the cell for supplying a sufficient amount of heat to thermally activate said solid salt thereby causing said salt to become a strong ionic conductor.

2. The thermal cell of claim 1 wherein said salt becomes a strong electrolyte in the molten or liquid state upon thermal activation.

3. The thermal cell of claim 1 wherein said salt becomes a strong electrolyte due to a change to a solid phase with inherently high ionic conductivity.

4. The thermal cell of claim 1 wherein said alkyl ammonium iodide is a quaternary ammonium compound and each of said alkyl groups contain from about 1 to 4 carbon atoms.

5. The thermal cell of claim 1 wherein said solid inorganic salt provides a sufficient amount of electrical current to operate a timing or sensing circuit having low power requirements.

* * * * *